(12) United States Patent
Nguyen

(10) Patent No.: US 7,333,012 B1
(45) Date of Patent: Feb. 19, 2008

(54) VEHICLE MONITORING AND CONTROL USING RADIO FREQUENCY IDENTIFICATION

(76) Inventor: Martin Khang Nguyen, 13691 Palomar St., Westminster, CA (US) 92683

( * ) Notice: Subject to any disclaimer, the term of this patent is extended or adjusted under 35 U.S.C. 154(b) by 196 days.

(21) Appl. No.: 10/853,445

(22) Filed: May 25, 2004

(51) Int. Cl.
*B60R 25/10* (2006.01)
*B60Q 1/00* (2006.01)
*G08B 1/08* (2006.01)
*G08B 13/14* (2006.01)
*G06F 19/00* (2006.01)

(52) U.S. Cl. ............... 340/539.1; 340/426.1; 340/426.11; 340/435; 340/572.1; 340/572.2; 701/99; 701/101; 701/110; 701/112; 701/300; 701/301; 701/302

(58) Field of Classification Search ............. 340/572.1, 340/539, 10.1, 5.1, 5.8, 457.2, 3, 905, 933, 340/936, 539.1, 928, 426.1, 427, 426.11, 340/435–436, 572.2; 701/1, 36, 41, 51, 70, 701/99–115, 300
See application file for complete search history.

(56) References Cited

U.S. PATENT DOCUMENTS

| | | | | |
|---|---|---|---|---|
| 5,420,794 A | * | 5/1995 | James | ............ 701/117 |
| 5,969,433 A | * | 10/1999 | Maggiora et al. | ............ 307/10.5 |
| 6,052,068 A | * | 4/2000 | Price R-W et al. | ............ 340/933 |
| 6,109,568 A | * | 8/2000 | Gilbert et al. | ............ 246/3 |
| 6,112,152 A | * | 8/2000 | Tuttle | ............ 701/115 |
| 6,124,805 A | * | 9/2000 | Gabbard | ............ 340/825.72 |
| 6,166,658 A | * | 12/2000 | Testa | ............ 701/93 |
| 6,459,367 B1 | * | 10/2002 | Green et al. | ............ 340/440 |
| 7,049,942 B2 | * | 5/2006 | Gallovich | ............ 340/426.1 |

* cited by examiner

*Primary Examiner*—Benjamin C. Lee
*Assistant Examiner*—Lam Pham
(74) *Attorney, Agent, or Firm*—Blakely, Sokoloff, Taylor & Zafman

(57) ABSTRACT

An embodiment of the present invention includes a technique to monitor a vehicle. A radio frequency (RF) identification (RFID) tag is installed in a vehicle to transmit vehicle information to a vehicle monitor. The vehicle monitor transmits a command to the vehicle upon receipt of the vehicle information based on a vehicle condition. A controller activates a control action to a mechanism controlling the vehicle in response to the command. In another embodiment of the invention, the vehicle monitor includes a field generator, an RFID reader, and a controller. The field generator generates a radio frequency (RF) field to awaken a radio frequency identification (RFID) tag installed in a vehicle driven by a driver. The RFID reader receives vehicle information transmitted by the RFID tag when the RFID tag is awaken by the field generator. The controller is communicatively coupled to the RFID reader to transmit a command to the vehicle based on the vehicle information and a vehicle condition.

13 Claims, 4 Drawing Sheets

US 7,333,012 B1

VEHICLE MONITORING AND CONTROL USING RADIO FREQUENCY IDENTIFICATION

BACKGROUND

1. Field of the Invention

Embodiments of the invention relates to the field of traffic engineering, and more specifically, to vehicle monitoring and control.

2. Description of Related Art

Car accidents cause a significant loss to the economy in a number of ways, including loss of lives, insurance costs, hospital expenses, etc. There are a number of causes for car accidents. Examples of these causes include driving under the influence or drowsiness, poor weather conditions, etc. To help reduce the accidents, law enforcement officers have increasingly made efforts to check vehicles on streets, install check points, etc. These efforts, unfortunately, are not effective because they do not deal with real-time incidents when accidents occur.

In addition to car accidents, there are also many other costs associated with the use of vehicles by the public. Examples of these costs include stolen vehicles, police pursuit of criminals, etc. Techniques, such as LoJack, to help locate stolen vehicles are not cost effective and inefficient. Typically, the response time may be too slow.

Accordingly, there is a need to have an effective method to monitor and/or control vehicles.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention is a technique to monitor a vehicle. A radio frequency (RF) identification (RFID) tag is installed in a vehicle to transmit vehicle information to a vehicle monitor. The vehicle monitor transmits a command to the vehicle upon receipt of the vehicle information based on a vehicle condition. A controller activates a control action to a mechanism controlling the vehicle in response to the command. In another embodiment of the invention, the vehicle monitor includes a field generator, an RFID reader, and a controller. The field generator generates a radio frequency (RF) field to awaken a radio frequency identification (RFID) tag installed in a vehicle driven by a driver. The RFID reader receives vehicle information transmitted by the RFID tag when the RFID tag is awaken by the field generator. The controller is communicatively coupled to the RFID reader to transmit a command to the vehicle based on the vehicle information and a vehicle condition.

The advantages of embodiments of the invention include: (1) Real-time monitoring and control of vehicles, (2) Versatility and efficiency in control using automatic and remote techniques, and (3) Effectiveness in preventing accidents, collisions, or other dangerous situations.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 1:
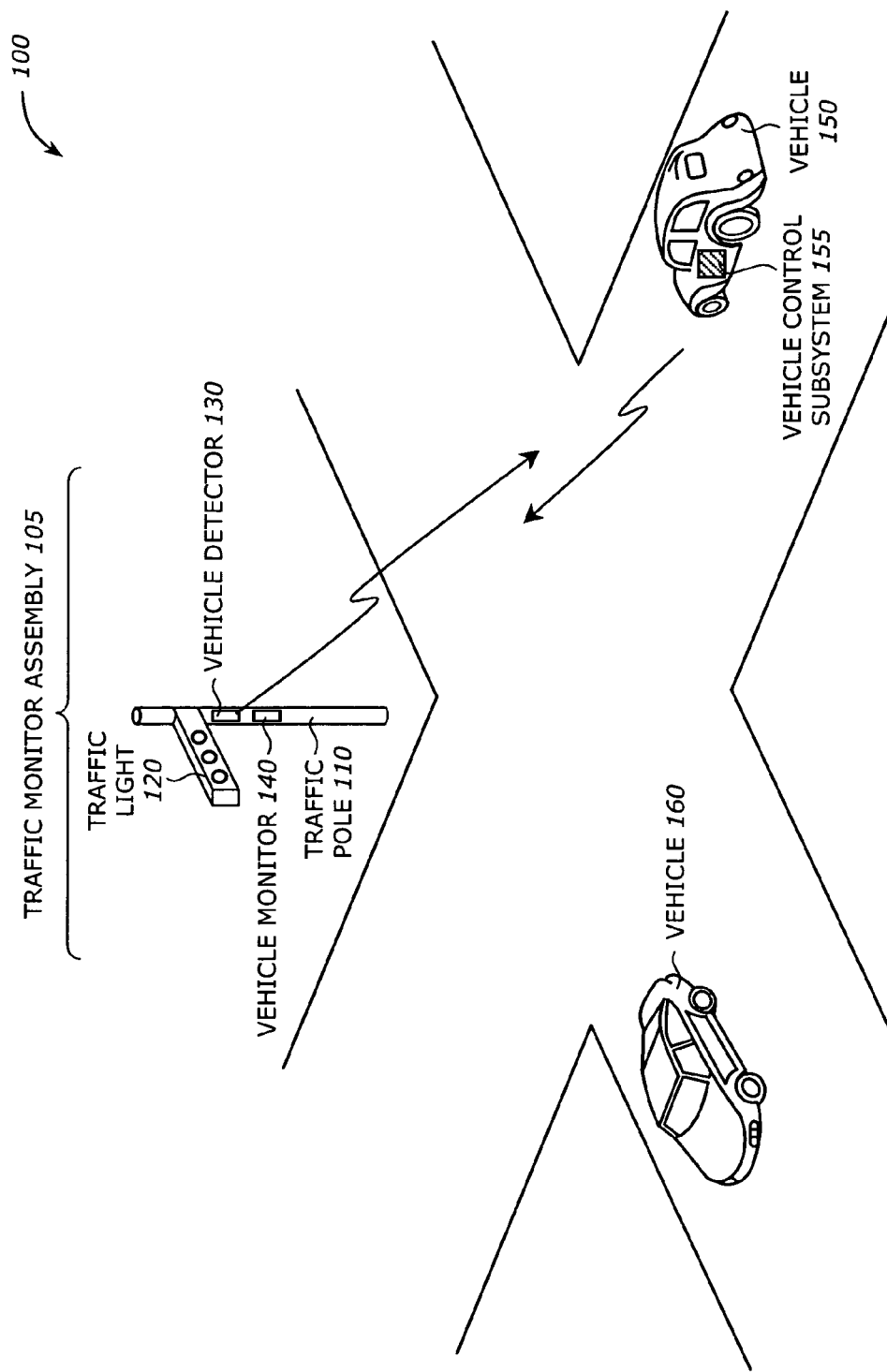
FIG. 1 is a diagram illustrating a system in which one embodiment of the invention can be practiced.

FIG. 1 is a diagram illustrating a system 100 in which one embodiment of the invention can be practiced. The system 100 includes a traffic monitor assembly 105 and vehicles 150 and 160. The traffic monitor assembly 105 includes a traffic pole 110, a traffic light 120, a vehicle detector 130, and a vehicle monitor 140.

The traffic pole 110 provides housing and/or attachment for the vehicle detector 130 and the vehicle monitor 140. It is contemplated that means other than the traffic pole 110 may be used to house the vehicle detector 130 and/or the vehicle monitor 140. Examples of these means include any secure housing at a public place, or where vehicle monitoring is desired. The traffic pole 110 may offer some advantages such as: (1) it is located at intersections or places that there are traffic and vehicle movements, (2) it has direct connections to the traffic light 120 to regulate traffic flow, and (3) it is an existing structure in cities.

The traffic light 120 is any traffic light assembly that is mounted to the traffic pole 120. It may be on a fixed structure or hung across wires or flexible elements that allow it to be visible by people. It has the standard three lights: red, green, and yellow to regulate traffic flow. It may be controlled by a light controller which may be connected to the vehicle monitor 140.

The vehicle detector 130 is a device or system that detects a vehicle condition of a vehicle. It is mounted or installed at a suitable location on a support structure such as the traffic pole 110. It may include an electronic, electromagnetic, or optical sensor or sensors. Examples of these sensors may include camera, video capture devices, video recorder, infrared sensor, laser, radar speed detector. It may also include a receiver that receives electronic report of lost or stolen vehicles. It may have communication devices and/or processing unit to receive information remotely, either by wireless or by wired connections. The vehicle condition is a condition that may cause attention or control. It may be one of a loss condition, a speed condition, and a lighting condition. The loss condition is a condition where a vehicle is reported lost or stolen. For example, law enforcement officers may enter identifiers of vehicles that have been reported stolen to the traffic detector 130. The speed condition is a condition where a vehicle may travel or move at an abnormal or dangerous speed. For example, a drunken or sleepy driver may drive his or her car at an erratic manner such as swerving from left to right or right to left, or at very high speed that may cause accidents or collisions. The lighting condition is a condition where a vehicle may have an abnormal or dangerous lighting such as high beam or no light at all at dark.

The vehicle monitor 140 monitors one or more vehicles such as vehicles 150 and 160, either moving or stationary, within an operational range around the traffic pole 110. In one embodiment, the vehicle monitor 140 transmits and/or receives radio frequency (RF) signals. The operational range may be from a few meters to hundreds of meters depending on the signal strength. The vehicle monitor 140 may also include or have interface to the traffic light controller or other sensors such as environmental sensors to detect the environmental conditions (e.g., humidity, fog, temperature) or traffic condition (e.g., congested traffic)

The vehicles 150 and 160 are any vehicles that are being monitored by the vehicle monitor. They may be moving or stationary. The vehicle 150 includes a vehicle control subsystem 155 that controls the vehicle 150. The owner of the vehicle registers the information necessary for the monitoring and control of the vehicle. The registration may be performed via a law-enforcement agency (e.g., the department of motor vehicles) or a commercial private organization. The vehicle control subsystem 155 communicates with the traffic monitor 140 to send identification information and receive command to control the vehicle 150. The communication may be passive or active. A passive communication is one in which the driver of the vehicle 150 is not aware of the communication. An active communication is one in which the driver is aware of and may even participate in the communication. The vehicle 160 does not have a vehicle control subsystem but it is monitored by the vehicle monitor 140.

In a typical scenario, the driver of the vehicle 150 may be sleepy or drunken and is accelerating the vehicle 150 at a very high speed. The vehicle detector 130 detects this dangerous vehicle condition, perhaps by a radar speed detector, from a distance and triggers the vehicle monitor 140. The vehicle monitor 140 then generates a field signal to awaken the vehicle control subsystem 155 when the vehicle enters the field. The vehicle control subsystem 155 then transmits a RF identification information to the vehicle monitor 140. This RFID information contains useful information about the vehicle 150 such as the registration information, the vehicle configuration, the vehicle type, the various control modes, the owner's information, the vehicle status (e.g., speed, gear, brake condition, light condition). Upon receipt of this RFID information, the vehicle monitor 140 goes through a decision process based on the information and other environmental conditions. For example, the RFID information may indicate that the driver of the vehicle 150 is not applying the brake while approaching the intersection at high speed. In addition, the traffic light controller may indicate that the traffic light 120 facing the approaching vehicle 150 is yellow or red. Based on these data, the vehicle monitor 140 may decide to send a command to the vehicle control subsystem 155 to apply the brake. The vehicle control subsystem 155 receives the command and generates a control signal to a mechanism that activates a brake action to slow down the vehicle 150 and may stop it at a suitable distance from the intersection. If the RFID information indicates that the driver is applying the brake, the command to activate the brake actions may be cancelled or directed to a secondary brake control to safely brake the vehicle. Alternatively, the vehicle monitor 140 may decide to switch the traffic lights to resolve the danger, such as turning the green light of traffic in the other direction to red. This automatic and remote monitoring and control process may prevent serious collision or accident on the street.

There are numerous scenarios showing that the remote monitoring and control process provided by the vehicle monitor 140 and/or the vehicle control subsystem 155 is useful in preventing accidents from occurring. Other beneficial results may also be obtained. For example, the vehicle 150 may be reported stolen. The report is registered to the vehicle detector 130. The vehicle monitor 140 may generate a field signal continuously to all vehicles passing through its range of operation. When the vehicle 150 approaches the vehicle monitor 140, it responds to the field signal by transmitting its RFID information. The vehicle monitor 140 obtains the RFID information and matches it with its database of reported stolen vehicle. When a match is found, the vehicle monitor 140 may transmit an alarm signal to a law enforcement unit, such as a police car nearby. The law enforcement unit may then arrive at the scene and stop the vehicle 150. The vehicle monitor 140 may also send a command signal to the vehicle control subsystem 155 to turn off the engine in a safe manner so that law enforcement officers may arrive in time. In another scenario, the vehicle 150 may be the target of a police pursuit. The pursuing law enforcement officers may remotely enter the information of the vehicle 150 to the vehicle monitor 140 and the command to disable the vehicle 150 or stop the engine in a safe manner.

The vehicle monitor 140 may work with multiple vehicles, each having a subsystem similar to the vehicle control subsystem 155, as long as these vehicles are within its operational range.

Figure 2:
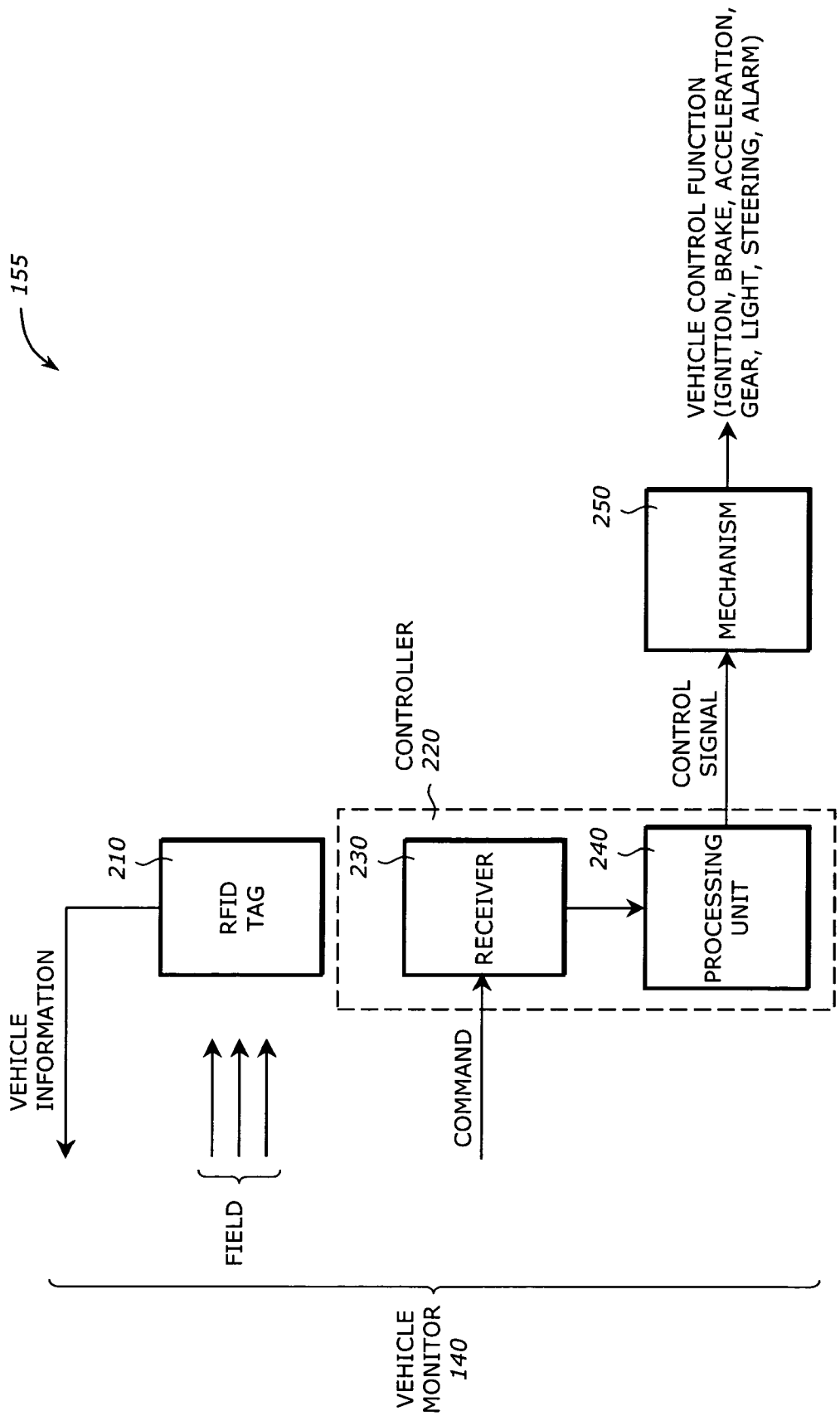
FIG. 2 is a diagram illustrating a vehicle control subsystem according to one embodiment of the invention.

FIG. 2 is a diagram illustrating a vehicle control subsystem 155 according to one embodiment of the invention. The vehicle control subsystem 155 includes an RFID tag 210 and a controller 220.

The RFID tag 210 is a device that responds to the field signal from the vehicle monitor 140. It is installed in the vehicle 150 to transmit vehicle information to the vehicle monitor 140. The transmission is through RF transmission. Typically, this transmission automatically occurs when the RFID tag 210 is within the range of the field signals or when it is awaken by the field signals. The vehicle information includes at least one of a vehicle identifier, a control type, a vehicle status, and a registration information. The vehicle identifier is any identifier that identifies or describes the vehicle 150. It may be a special code provided to the vehicle owner when he or she registers for the remote monitoring and control service provided by a commercial or governmental unit. It may also be the vehicle identification number (VIN) provided by the department of motor vehicles. The control type provides information on the type or types of control that may be activated to control the vehicle 150. For example, the control type may indicate that only a brake control is available, or all control actions are available. The vehicle status provides the status of the vehicle 150. The status may include driving conditions such as whether or not the brake is being applied, whether or not the wiper is moving, whether or not the lights are turned on, etc. The registration information includes any information when the vehicle 150 is registered for the service such as owner's information, contact information, accounting information, special accessories installed in the vehicle 150, etc.

The RFID tag 210 typically is in sleep mode when it is outside the range of the vehicle monitor 140. When the vehicle 150 enters the field region of the vehicle monitor 140, the RFID tag 210 is awaken to transmit the RFID information to the vehicle monitor 140. The field-initiated wake-up range may be within a normal range to detect approaching vehicles (e.g., between 2 to 33 meters) depending on the field strength. The RF frequency range may be any suitable range. In one embodiment, the RF wake-up frequency is between 400 to 450 MHz, and the tag transmission frequencies are in the range of 850 MHz to 940 MHz. The RFID tag 210 has memory capacity to store the vehicle information. The vehicle information may be pre-programmed or programmed remotely.

Upon receipt of the vehicle information, the vehicle monitor 140 transmits a command to the vehicle 150 based on the vehicle information and/or a vehicle condition detected by the vehicle detector 130. The controller 220 activates a control action to a mechanism 250 controlling the vehicle 150 in response to the command. The control action may be one of an ignition control, a brake control, an acceleration control, a gear control, a light control, a steering control, and an alarm control. The mechanism 250 is any mechanism that is designed to perform the control function corresponding to the control action. The mechanism 250 may be an existing mechanism in the vehicle or an interface to an existing mechanism. It may be a switch to turn on/off lights, an activator to activate a brake, etc.

The controller 220 includes a receiver 230 and a processing unit 240. The receiver 230 receives the command sent from the vehicle monitor 140. The receiver 230 is a RF receiver operating at an RF frequency compatible with the vehicle monitor 140. It may include a decoder to decode the command signal into a command word to be sent to the processing unit 240. The processing unit 240 generates a control signal to the mechanism 250 corresponding to the control action in accordance to the command. The processing unit 240 may be a processor system with a processor and associated devices such as memory and communication controllers. It may be a mobile processor, a single-chip controller, a micro-controller, or a logic circuit.

Figure 3:
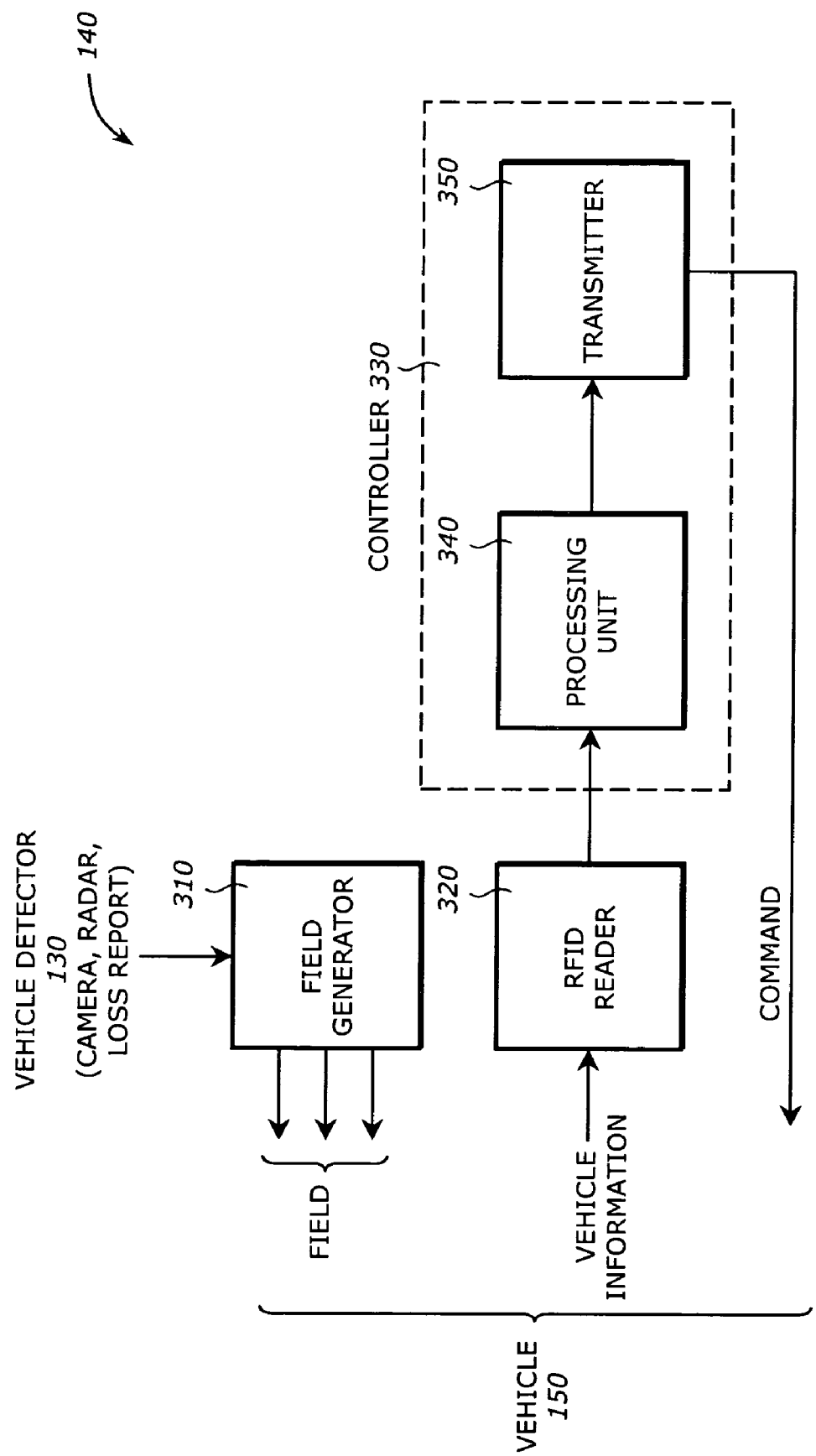
FIG. 3 is a diagram illustrating a vehicle monitor according to one embodiment of the invention.

FIG. 3 is a diagram illustrating the vehicle monitor 140 according to one embodiment of the invention. The vehicle monitor 140 includes a field generator 310, a RFID reader 320, and a controller 330.

The field generator 310 generates a radio frequency (RF) field to awaken a radio frequency identification (RFID) tag installed in the vehicle 150 (FIG. 1) driven by a driver. The operational range of the field generator 310 is typically dependent on the field strength. In one embodiment, the minimum range is one meter and the maximum range may go up to several hundred meters corresponding to the strongest field strength. Typically, the field frequency may range from 400 MHz to 450 MHz (e.g., 433 MHz).

The RFID reader 320 receives vehicle information transmitted by the RFID tag when the RFID tag is awaken by the field generator 310. The RFID reader 320 may read multiple RFID tags at the same time from several vehicles. It has multi-tag anti-collision capabilities when it reads multiple tags.

The controller 330 is communicatively coupled to the RFID reader to transmit a command to the vehicle based on the vehicle information and a vehicle condition. The controller 330 may be connected to the RFID reader 320 through wireless or wired connection. The wireless connection may be a RF, laser, or infrared connection.

The controller 330 includes a processing unit 340 and a transmitter 350. The transmitter 350 transmits a command to the vehicle 150. The transmitter 350 may be any RF transmitter that transmits RF signal that contains the command information at a frequency compatible with that of the vehicle monitor 140. The processing unit 340 generates the command based on the vehicle information when the vehicle condition is detected by the vehicle detector 130 (FIG. 1).

Figure 4:
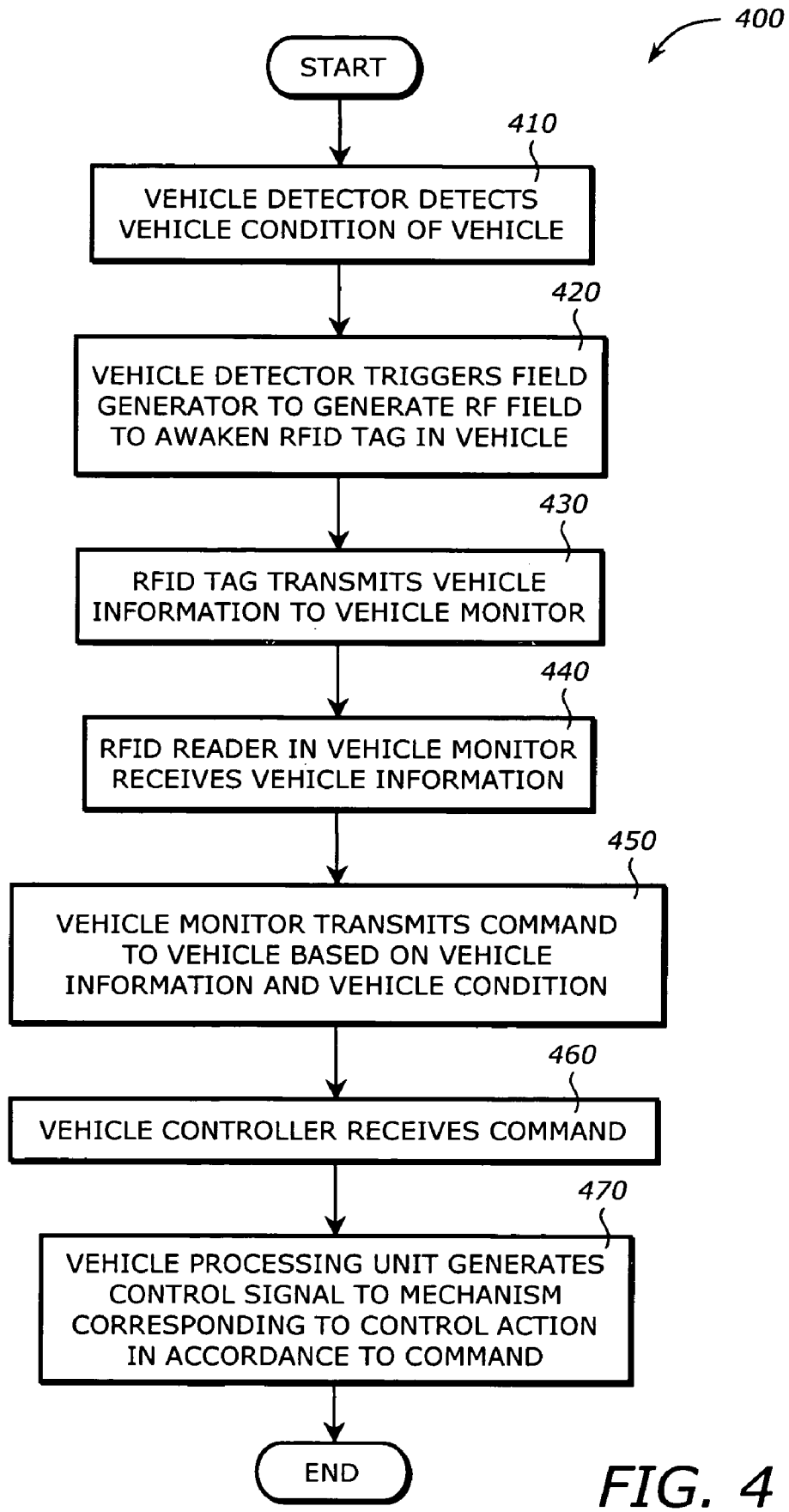
FIG. 4 is a diagram illustrating a process to monitor a vehicle using RFID according to one embodiment of the invention.

FIG. 4 is a diagram illustrating a process 400 to monitor a vehicle using RFID according to one embodiment of the invention.

Upon START, the vehicle detector detects a vehicle condition of a vehicle (Block 410). For example, the vehicle detector may receive a report of a stolen car, refreshes its database, detects a speeding vehicle via radar, an erratic movement via video imaging analysis, etc. Next, the vehicle detector triggers the field generator to generate an RF field to awaken the RFID tag in the vehicle (Block 420). Depending on the nature of the vehicle condition, the field generator may adjust the field strength to change the range. For example, if the vehicle detector detects that the vehicle is traveling at high speed, it may uses high field value to provide long operational range so that any abnormal, suspicious, or dangerous motion or movement of the vehicle can be dealt with as early as possible.

Then the RFID tag installed in the vehicle transmits the vehicle information to the vehicle monitor (Block 430). Next, the vehicle monitor transmits a command to the vehicle based on the vehicle information and the vehicle condition (Block 450). Then, the controller in the vehicle control subsystem receives the command (Block 460). The command may be further decoded or deciphered before sending to the processing unit. Next, the processing unit generates a control signal to a mechanism corresponding to the control action as provided in the command (Block 470). The process 400 is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
   a vehicle detector to detect a vehicle condition of a vehicle; and
   a vehicle monitor coupled to the vehicle detector to monitor the vehicle, the vehicle monitor comprising:
     a field generator to generate a radio frequency (RF) field in a field region to awaken a radio frequency identification (RFID) tag installed in the vehicle driven by a driver when the vehicle is within the field region,
     a RFID reader to receive vehicle information transmitted by the RFID tag when the RFID tag is awaken by the field generator, and
     a monitor controller communicatively coupled to the RFID reader to transmit a command to the vehicle based on the vehicle information and a vehicle condition.

2. The system of claim 1 wherein the monitor controller comprises:
   a transmitter to transmit the command; and
   a processing unit coupled to the transmitter to generate the command when the vehicle condition is detected by the vehicle detector.

3. The system of claim 2 wherein the vehicle condition is one of a loss condition, a speed condition, and a lighting condition.

4. The system of claim 1 wherein the command is one of an ignition command, a brake command, an acceleration command, a gear command, a light command, a steering command, and an alarm command.

5. The system of claim 1 wherein the vehicle information includes at least one of a vehicle identifier, a control type, a vehicle status, and a registration information.

6. The system of claim 1 further comprising:
a vehicle control subsystem in the vehicle comprising the RFID tag to transmit the vehicle information; and a vehicle controller to activate a control action to a mechanism controlling the vehicle in response to the command.

7. The system of claim 6 wherein the vehicle controller comprises:
a receiver to receive the command; and
a processing unit coupled to the receiver to generate a control signal to the mechanism corresponding to the control action in accordance to the command.

8. The system of claim 6 wherein the control action is one of an ignition control, a brake control, an acceleration control, a gear control, a light control, a steering control, and an alarm control.

9. The system of claim 8 wherein the mechanism is one of a ignition mechanism, a brake mechanism, an acceleration mechanism, a gear mechanism, a light mechanism, a steering mechanism, and an alarm mechanism.

10. The system of claim 9 wherein the vehicle controller activates the ignition control to the ignition mechanism to turn off engine of the vehicle.

11. The system of claim 9 wherein the vehicle controller activates the brake control to the biake mechanism if the brake mechanism is not activated by the driver of the vehicle.

12. The system of claim 9 wherein the vehicle controller activates the light control to the light mechanism to turn on a light of the vehicle.

13. The system of claim 9 wherein the vehicle controller activates the steering control to the steering mechanism to steer the vehicle away from an object.

* * * * *